United States Patent
Maciel (10) Patent No.: US 12,314,774 B2
(45) Date of Patent: May 27, 2025

(54) DYNAMIC CONTAINERIZED CONTENT DELIVERY

(71) Applicant: Red Hat, Inc., Raleigh, NC (US)

(72) Inventor: Og Benso Maciel, Chapel Hill, NC (US)

(73) Assignee: Red Hat, Inc., Raleigh, NC (US)

( * ) Notice: Subject to any disclaimer, the term of this patent is extended or adjusted under 35 U.S.C. 154(b) by 454 days.

(21) Appl. No.: 17/171,861

(22) Filed: Feb. 9, 2021

(65) Prior Publication Data

US 2022/0253342 A1     Aug. 11, 2022

(51) Int. Cl.
| | | |
|---|---|---|
| G06F 9/455 | (2018.01) | |
| G06F 9/445 | (2018.01) | |
| G06F 9/50 | (2006.01) | |
| H04L 67/00 | (2022.01) | |

(52) U.S. Cl.
CPC ........ *G06F 9/5077* (2013.01); *G06F 9/44505* (2013.01); *G06F 9/45558* (2013.01); *H04L 67/34* (2013.01); *G06F 2009/45562* (2013.01); *G06F 2009/45595* (2013.01)

(58) Field of Classification Search
CPC .............. G06F 9/5077; G06F 9/44505; G06F 9/45558; G06F 2009/45562; G06F 2009/45595; H04L 67/34
See application file for complete search history.

(56) References Cited

U.S. PATENT DOCUMENTS

| | | |
|---|---|---|
| 6,789,251 B1 | 9/2004 | Johnson |
| 8,689,178 B2 | 4/2014 | Ambrose et al. |
| 9,967,318 B2 | 5/2018 | Fu et al. |
| 10,430,204 B2 | 10/2019 | Reeves et al. |
| 10,545,738 B1 | 1/2020 | Jaeger et al. |
| 10,637,952 B1 | 4/2020 | Koenig et al. |
| 2019/0102206 A1* | 4/2019 | Fichtenholtz ......... G06F 9/5027 |
| 2019/0286486 A1* | 9/2019 | Ma ...................... G06F 9/5027 |
| 2019/0354389 A1* | 11/2019 | Du ..................... G06F 9/45545 |
| 2020/0326931 A1* | 10/2020 | Nadgowda ........... H04L 41/085 |
| 2021/0097476 A1* | 4/2021 | Ding ................... G06F 9/45558 |
| 2021/0157623 A1* | 5/2021 | Chandrashekar ..... G06F 9/5072 |
| 2021/0382846 A1* | 12/2021 | Miller ............... G06F 15/17331 |

OTHER PUBLICATIONS

Kecskemeti, Gabor et al., "The ENTICE Approach to Decompose Monolithic Services into Microservices", Institute for Computer Science and Control, Hungarian Academy of Sciences, Hungary.

* cited by examiner

*Primary Examiner* — Dong U Kim
(74) *Attorney, Agent, or Firm* — Womble Bond Dickinson (US) LLP (57) ABSTRACT

A method includes receiving a request for content associated with a content platform and in response to receiving the request, retrieving the requested content from the content platform. The method further includes generating a container image including the content and providing the container image to an execution platform to instantiate one or more instances of the container image.

20 Claims, 6 Drawing Sheets

DYNAMIC CONTAINERIZED CONTENT DELIVERY

TECHNICAL FIELD

Aspects of the present disclosure relate to software content delivery, and more particularly, to dynamic and containerized content delivery.

BACKGROUND

Digital content, such as software, (e.g., applications, consumable data, etc.) must be provided to consumers for the consumer to be able to use the content. The content is generally provided to the consumer's system, whether it be a virtual machine on the cloud, a local personal computer, or any other computing device from a medium that contains the content, such as a server, a compact disk, a flash drive, etc.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Delivery of content (e.g., software) may be done in several ways. For example, traditional delivery of content included providing a hard copy medium of the software/content to a user to be loaded onto the user's system. Newer methods of content delivery include downloading of the content from a content server to the user's system. Additionally, some content platforms provide customers access to some or all of the platforms content using a subscription model. Accordingly, customers are provided access to the content for their needs based on their particular subscription details. While downloading the content from the server to the system is generally quick and reliable for a single system and small amounts of content, when the customer's system is of larger scale (e.g., a large company) with a large number of systems to which the content is to be downloaded, the current methodology is not cost effective. For example, if a company requires download of software to ten-thousand systems (e.g., virtual machines) then the process of providing that content to all the systems may incur substantial network traffic, utilize many computing resource, and may take a long time to perform.

Aspects of the present disclosure address the above-noted and other deficiencies by providing for dynamic containerized content delivery. When a customer requests content (e.g., under the customer's subscription), then a virtualized environment, such as a virtual machine or a container, may be generated with the requested content included. For example, a content delivery module may identify the requested content and the file systems containing the requested content at the content platform. The content delivery module may clone the identified file systems and build a container image (or VM image) and include the cloned file systems within the container image. The container image may then be instantiated, either within a cloud infrastructure or in a local infrastructure of the customer, as many times as the customer requires and is allowed under the subscription.

Accordingly, providing dynamic containerized content delivery substantially reduces the time required to provide usable content to customers at a large scale and reduces the costs associated with hosting and providing content to the customers. Embodiments of the present disclosure reduce the amount of data to be downloaded from the content host therefore reducing network traffic, utilization of compute resources, and the costs associated with such. Furthermore, several systems with the requested content may be generated quickly without the need to download the content to each of the systems. Additionally, because the VM may be instantiated relatively quickly, the systems may be destroyed when usage is complete and re-instantiated whenever needed. The present disclosure also provides for providing content granularly because the container image may be generated with specific content selected by the customer.

Figure 1:
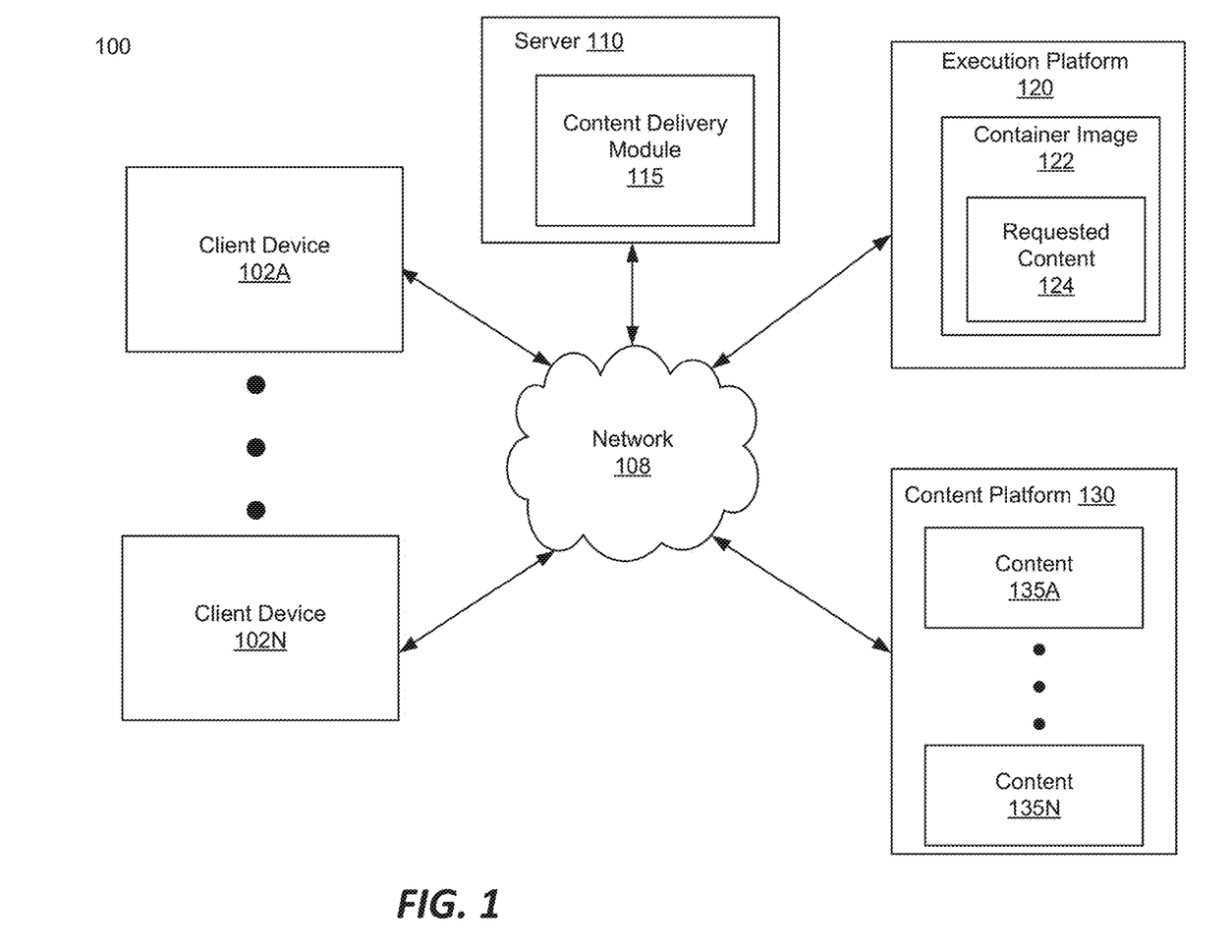
FIG. 1 is a system diagram that illustrates an example system for dynamic containerized content delivery, in accordance with some embodiments.

FIG. 1 is a block diagram illustrating a system 100 for dynamic containerized content delivery according to some embodiment. System 100 includes client devices 102A-N, server 110, execution platform 120, and content platform 130 coupled to network 108. Network 108 may be any type of network such as a public network (e.g., the Internet), a private network (e.g., a local area network (LAN), Wi-Fi, or a wide area network (WAN)), or a combination thereof. Client devices 102A-N (where N is a positive integer) may each be any data processing device, such as a desktop computer, a laptop computer, a mainframe computer, a personal digital assistant, a rack-mount server, a hand-held device or any other device configured to process data.

Server 110 may be any type of server, such as an application server, a web server, an FTP server, or any other type of server with which a user device can communicate. Execution platform 120 may be a cloud computing platform, a server, a customer's internal computing infrastructure, or any other platform for executing one or more containers and for consuming content by a user or customer (e.g., via client devices 102A-N). Content platform 130 may be a content storage and management platform from which users may retrieve and consume content. Content platform 130 may store and manage content 135A-N. Content 135A-N may include software, media, or any other consumable data. In one example, the content platform 130 may be a third party platform that may store and manage content for content developers (e.g., software developers). In another example, the content platform 130 may be a platform managed locally by a content developer.

Server 110 may include content delivery module 115 for delivering content from the content platform 130 to the execution platform 120. In other embodiments, content delivery module 115 may be included in content platform 130, the execution platform 120, or any other device in communication with the content platform 130 and the execution platform 120. Content deliver module 115 may retrieve one or more pieces of content 135A-N from the content platform and generate a container image which includes the retrieved content. For example, the content delivery module 115 may generate container image 122 and include the requested content 124 (i.e., the content retrieved from the content platform 130) as a file system within the container. In other words, rather than mounting a file system to a container instance, the file system for the content is included within the container itself. Once the container image 122 is generated, the content delivery module 115 may provide the container image 122 to the execution platform 120. The container image 122 may then be instantiated as many times as required by the customer. The container instances may then be deleted or instantiated at the execution platform 120 as needed.

The container image 122 may be an image of any virtualized execution environment. For example, the container image 122 may be an isolated container, an entire virtual machine, or any other containerized virtualization to include the requested content 124.

Figure 2:
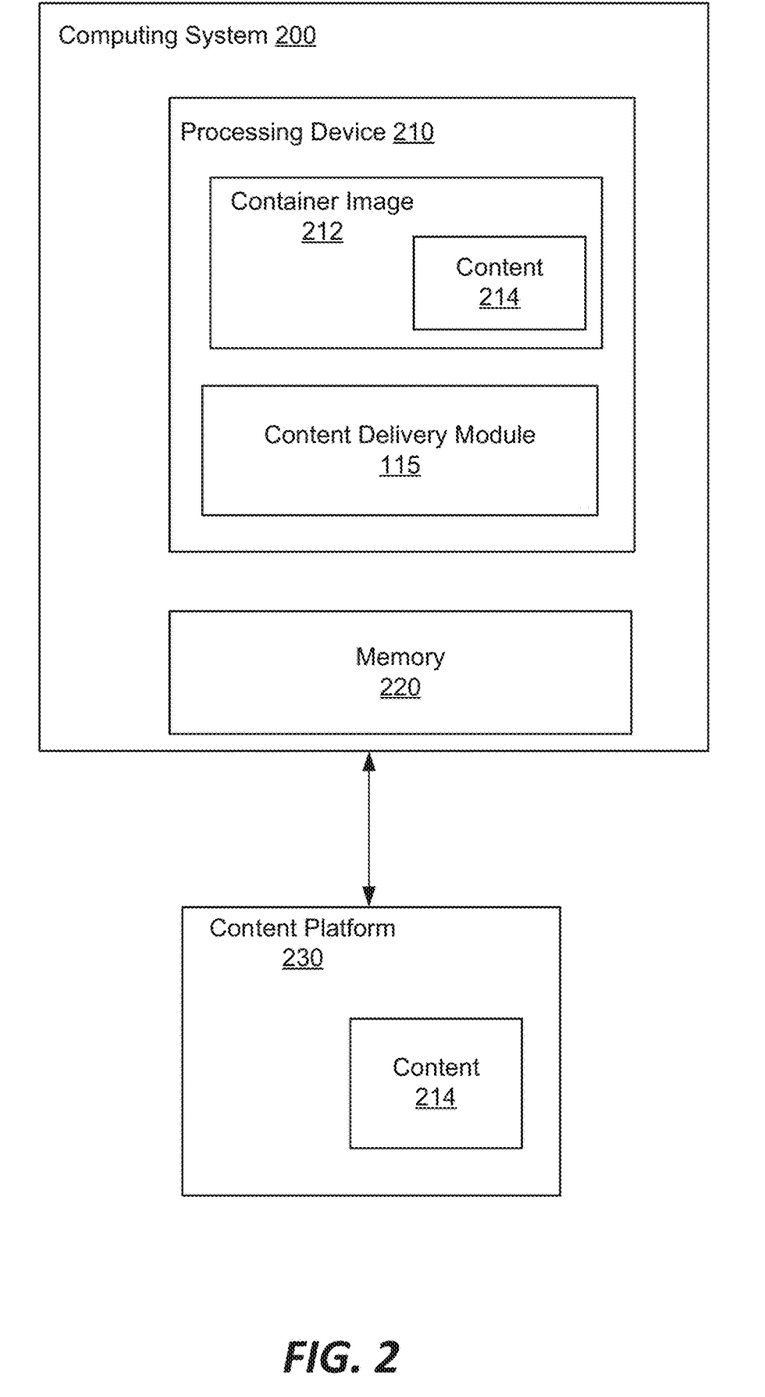
FIG. 2 is a block diagram that illustrates another example of a system for dynamic containerized content delivery, in accordance with embodiments of the disclosure.

FIG. 2 is a block diagram illustrating a computer system 200 for dynamic containerized content delivery, in accordance with some embodiments. Computing system 200 may include a processing device 210 and memory 220. Memory 220 may include volatile memory devices (e.g., random access memory (RAM)), non-volatile memory devices (e.g., flash memory) and/or other types of memory devices. The computer system 200 may be coupled to a content platform 230 for storing and managing content 214. The processing device 210 may include container image 212 which may further include content 214 retrieved from the content platform 230.

The processing device 210 may further include content delivery module 115. Content delivery module 115 may be the same or similar to content delivery module 115 described with respect to FIG. 1. The content delivery module 115 may receive a request for content 214 from a user and retrieve the requested content 214 from the content platform 230. The content delivery module 115 may generate container image 212 and include the content 214 within the container image 212. For example, the content delivery module 115 may include a file system of the content 214 in the container image 212. The content delivery module 115 may then provide the container image 212 to an execution platform (e.g., cloud computing platform, local computing infrastructure, etc.) for the container image 212 to be instantiated as many times as required by the customer. Accordingly, the content 214 may be provided as needed and on demand by spinning up (i.e., instantiating) container instances from the container image 212.

In one example, the container image 212 may be a virtual machine image. Therefore, any number of virtual machines that include the requested content 214 may be instantiated on demand by the customer. In another example, when an update to the content has been uploaded to the content platform, the content delivery module 115 may detect the updated (e.g., via a notification) and retrieve the update. The content delivery module 115 may then generate a new container image with the updated content to replace the previous container image. Therefore, updates to the content do not require downloads of the update to each system (e.g., container or VM) at the execution platform. Rather, instances of the updated container image may be instantiated to provide the updated content.

Figure 3:
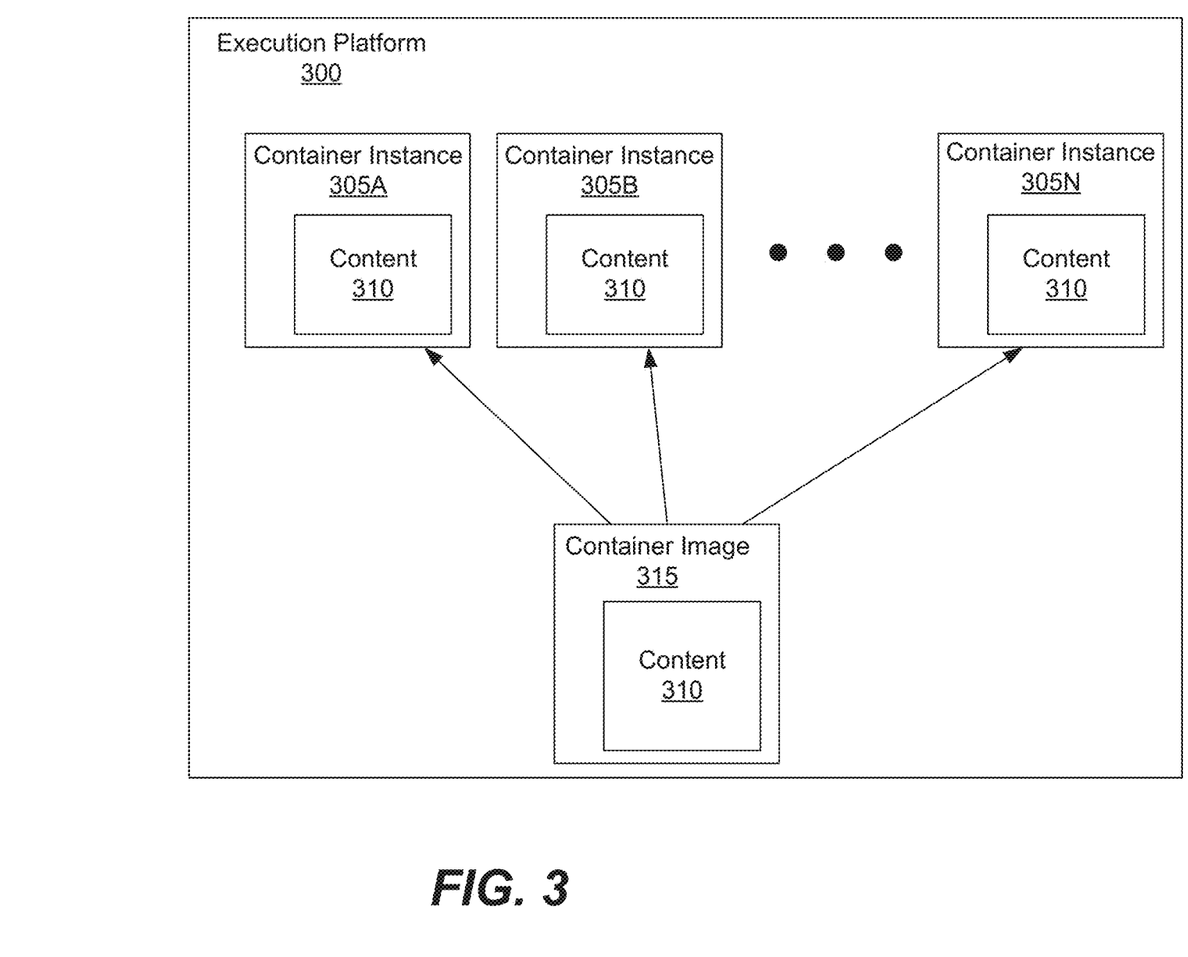
FIG. 3 is a block diagram of a system using dynamic containerized content deliver, in accordance with some embodiments.

FIG. 3 is a block diagram illustrating an execution platform 300 for dynamic containerized content delivery, in accordance with some embodiment. As described above, a container image 315 may be provided to the execution platform 300. The container image 315 may include content 310 requested by a user or customer. The execution platform 300 may then instantiate the container image 315 to create one or more container instances 305A-N (where N is a positive integer). Each container instance 305A-N may include the content 310 as included in the container image 315. In one example, the container instances 305A-N may be virtual machines. Therefore, each of the container instances 305A-N may be accessed and controlled by a user (e.g., via a client device in communication with the execution platform). Accordingly, users of the container instances 305A-N may have access to the content directly at the container instance 305A-N.

In one example, the execution platform 300 may include several host machines on which the container instances 305A-N may be distributed. Client devices of the customer may then access the container instances 305A-N executing on the host machines. Additionally, in one example, the container image 315 may be stored in persistent storage of the execution platform while the container instances 305A-N are executed in memory (e.g., volatile memory such as DRAM) only. Thus, the storage and consumption of the content 310 may be reduced to storage of the container image 315 rather than for content associated with each system (i.e., container or VM instance).

Additionally, once the content 310 has been consumed by a user of a container instance 305A-N and the container instance 305A-N is no longer being used, the execution platform 300 may destroy the unused container instance 305A-N. Therefore, the resource requirements for providing the content to several systems is minimal (i.e., the content 310 of each container instance 305A-N does not have to be persistently stored).

Figure 4:
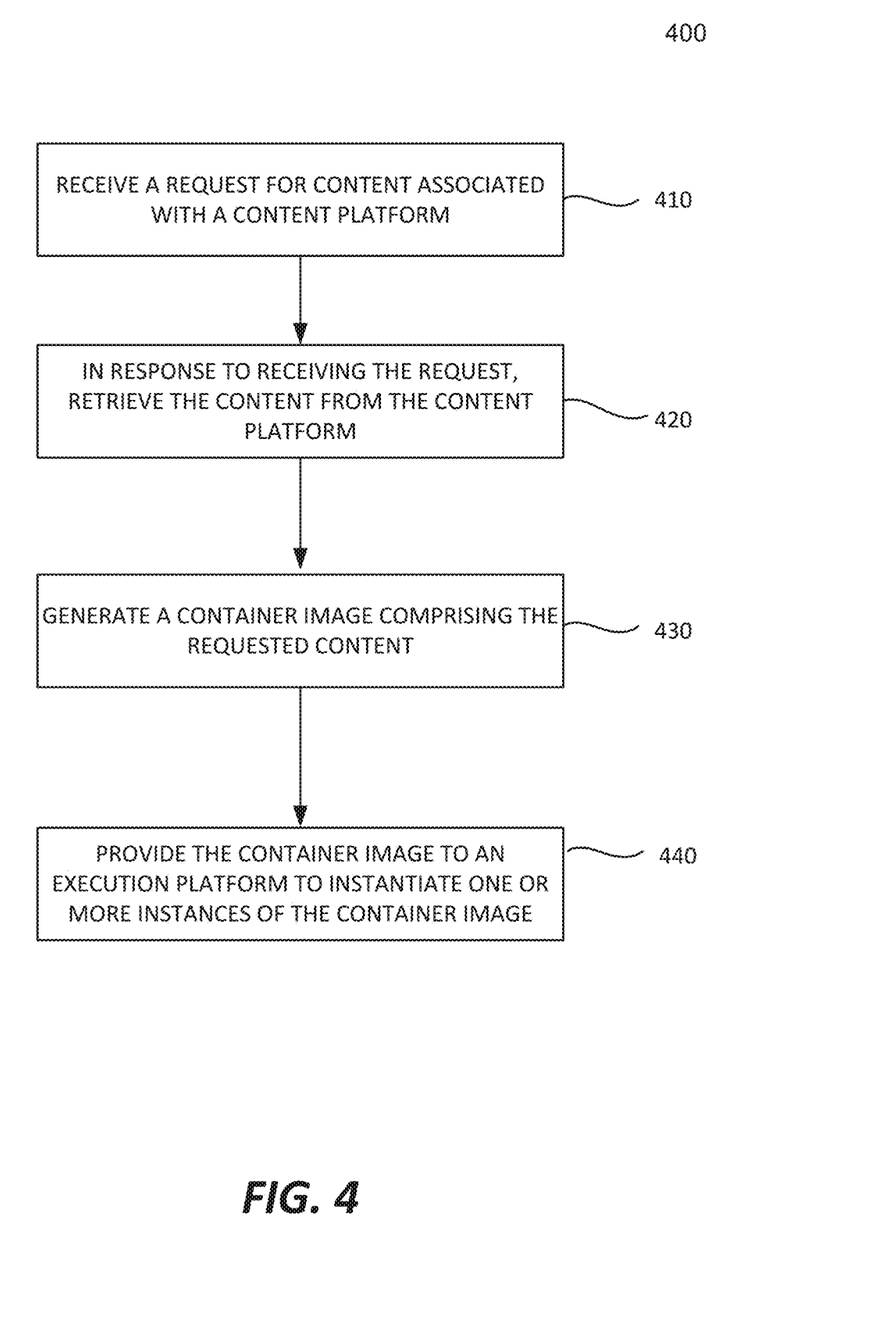
FIG. 4 is a flow diagram of a method of dynamically delivering content using a container, in accordance with some embodiments.

FIG. 4 is a flow diagram of a method 400 of dynamic containerized content delivery, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by content delivery module 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a request for content associated with a content platform. For example, the processing logic may present a user with an interface for selecting content from all content of the content platform that is available to the user (e.g., through the user's subscription). Accordingly, the user may select which content to be provided to the user in view of the user's needs. The user may granularly select which content to request which may include a subset of all the available content. In one example, the content may be one or more software programs, media content, or any other data, included in a subscription to the content platform.

At block 420, in response to receiving the request, the processing logic retrieves the requested content from the content platform. For example, the processing logic may download the content that is requested from the platform. While the user may use the content for several systems, as described below the processing logic may only download one copy of the content. Additionally, if the content that the user has requested has been updated, the processing logic may download the updated content (i.e., to update the container image discussed below).

At block 430, the processing logic generates a container image including the requested content. For example, the processing logic may identify one or more file systems that include the requested content. The processing logic may then clone the file systems and include those file systems within the container image. For example, the container image may be a virtual machine image and the file systems may be included in the virtual machine image such that the file systems are always mounted and accessible by the virtual machine.

At block 440, the processing logic provides the container image to an execution platform to instantiate one or more instances of the container image, each of the one or more instances of the container image comprising the content. For example, the user that requested the content may request several systems with access to the content. Accordingly, the execution platform may instantiate the number of containers as requested by the user. Each of the containers may include the content which may be accessible to the user.

Figure 5:
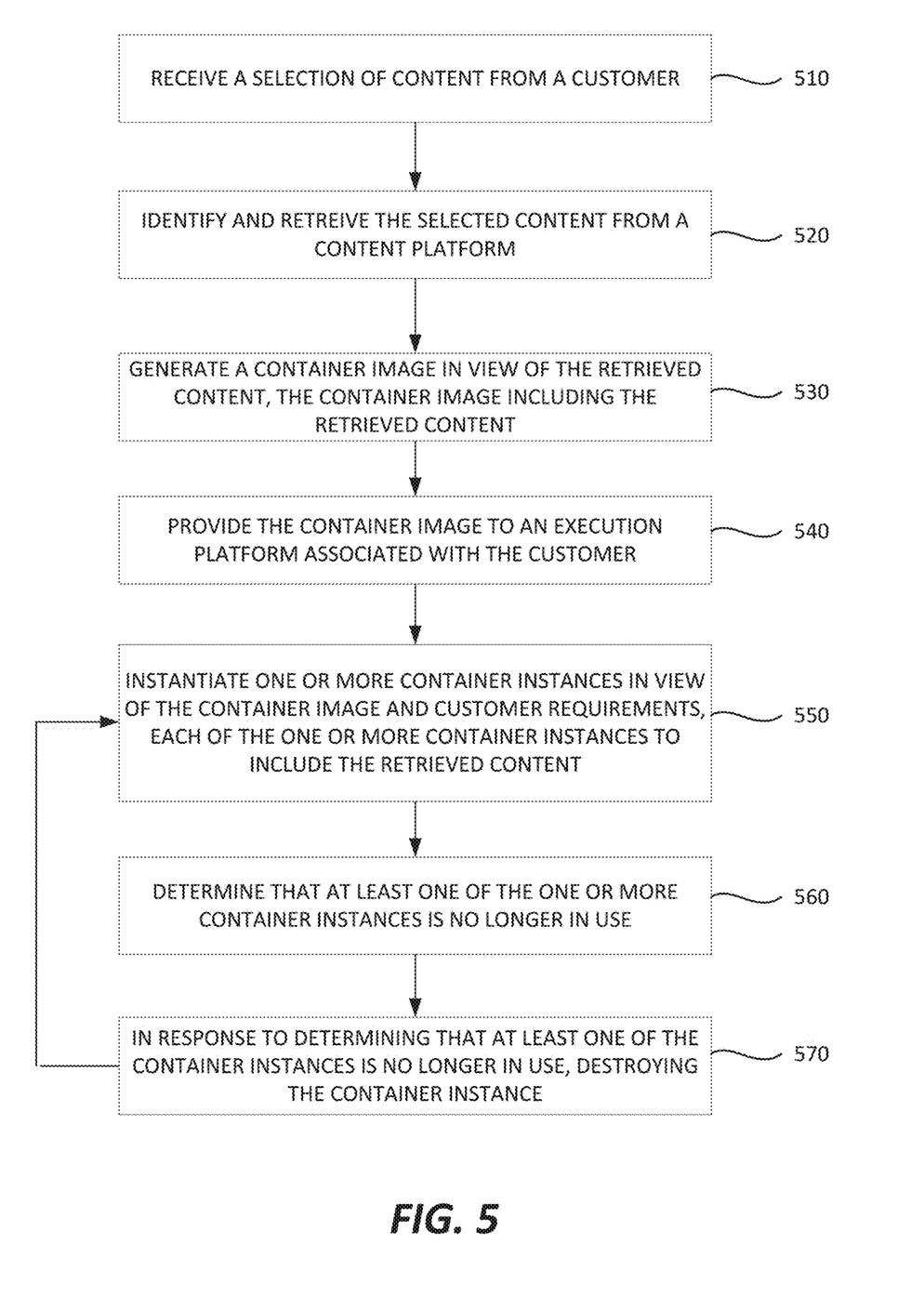
FIG. 5 is a flow diagram of another method of dynamically delivering content using a container, in accordance with some embodiments.

FIG. 5 is a flow diagram of a method 500 of dynamic containerized content delivery, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by content delivery module 115 of FIG. 1.

With reference to FIG. 5, method 400 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a selection of content from a customer. For example, based on the customer's content requirements, the processing logic may present (e.g., via a web interface) the customer a list of all the repositories and content that are available to the customer. In one example, the customer may be entitled to access certain products based on a subscription of the customer to content. The customer may then select one or more of the products presented to the customer.

At block 520, the processing logic identifies and retrieves the selected content from a content platform. The processing logic may identify the repositories, the products, the file systems, etc. associated with the selected content. The processing logic may then download the corresponding repositories, products, or file systems of the content.

At block 530, the processing logic generates a container image in view of the retrieved content, the container image including the retrieved content. For example, the repositories, products, file systems, etc. of the content retrieved from the content platform is included in the container image as it is built. Therefore, all the file systems will be included locally for each instance of the container image that is instantiated. Thus, the user of an instance may have direct access to the content within the container instance that is being used.

At block 540, the processing logic provides the container image to an execution platform associated with the customer. For example, the customer may use a cloud computing platform for executing business logic and providing virtualized systems as needed. Alternatively, or in conjunction with the cloud computing platform, the customer may have its own computing infrastructure on which computer systems are supported and executed. Accordingly, the execution platform may be a cloud computing platform, a customer managed computing infrastructure or a combination of the two.

At block 550, the processing logic instantiates one or more container instances in view of the container image, each of the one or more container instances to include the retrieved content. For example, one the container image is provided to the execution platform, the customer may instantiate instances of the container on demand. Therefore, the content can be provided as needed by instantiating instances of the container image with the content.

At block 560, the processing logic determines that at least one of the one or more container instances is no longer in use. For example, the processing logic may determine as the content is consumed whether the intended use of a container instance is completed. In one example, where the content comprises a software product with a particular use, the processing logic may determine that the container instance is no longer needed when the use of the software produce is completed. Alternatively, the user of the container instance may indicate that the user is finished with the instance and no longer needs the instance.

At block 570, in response to determining that at least one of the container instances is no longer in use, the processing logic destroys the corresponding container instances. However, as depicted, method 500 may continue to return to block 550 to instantiate additional instances of the container image on demand as needed by the customer.

Figure 6:
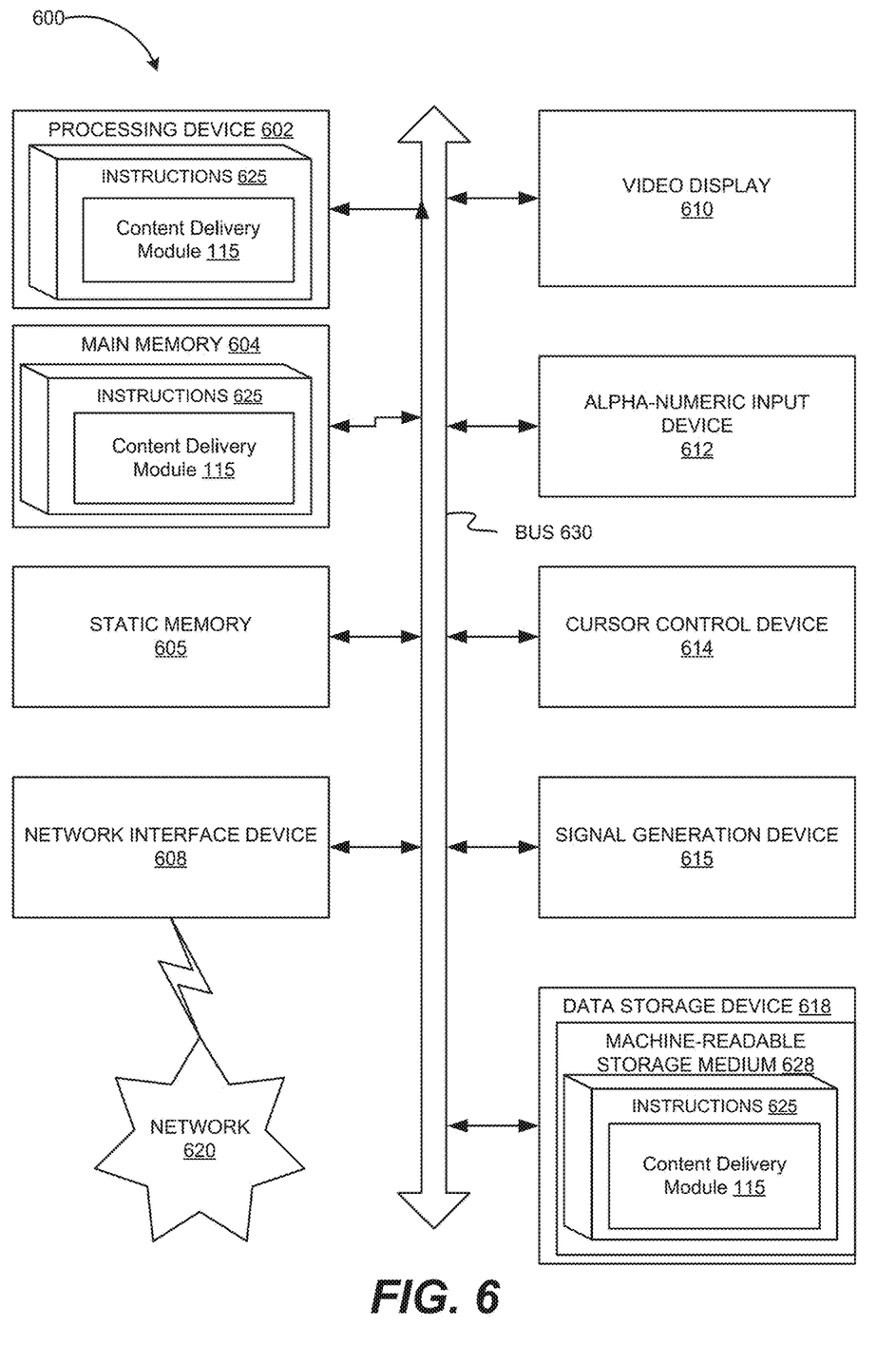
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for dynamic containerized content delivery, e.g., content delivery module 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   presenting a list of available user consumable content associated with a content platform;
   receiving a selection of content from the list of available content, wherein the selected content comprises user consumable data accessible via a subscription to the content platform;
   in response to receiving the selection, retrieving the selected content from the content platform;
   containerizing the selected content by generating, by a processing device, a container image comprising the selected content, wherein generating the container image comprises cloning at least one file system including the selected content and incorporating the at least one file system within the container image, wherein the cloning causes the at least one file system to be always mounted and accessible in the container image; and
   providing, by the processing device, the container image to an execution platform, separate from the content platform, to instantiate one or more instances of the container image on an as needed basis, in view of the subscription to the content platform, to present the selected content via the one or more instances of the container image,
   wherein instantiating the one or more instances of the container image on the as needed basis comprises: instantiating a required number of instances of the container image, the required number being determined according to a user requirement.

2. The method of claim 1, wherein the execution platform is a cloud computing platform.

3. The method of claim 1, wherein the selected content comprises one or more software programs included in the subscription to the content platform.

4. The method of claim 1, wherein the selection comprises a selection of a subset of the available content associated with the content platform.

5. The method of claim 1, wherein generating the container image comprises:
   identifying the at least one file system of the selected content associated with the content platform; and
   storing the at least one file system as part of the container image.

6. The method of claim 1, wherein each of the one or more instances of the container image comprises the selected content retrieved from the content platform.

7. The method of claim 1, further comprising:
   determining that at least one of the one or more instances of the container image that is no longer in use; and
   destroying the at least one of the one or more instances of the container image that is no longer in use.

8. A system comprising:
   a memory; and
   a processing device operatively coupled to the memory, the processing device to:
     present a list of available user-consumable content associated with a content platform;
     receive a selection of content from the list of available content associated with a content platform, wherein the selected content comprises user consumable data accessible via a subscription to the content platform;
     in response to receiving the selection, retrieve the selected content from the content platform;
     containerize the selected content by generating a container image comprising the selected content, wherein to generate the container image, the processing device is to:
       clone at least one file system including the selected content, and
       incorporate the at least one file system within the container image, wherein the cloning causes the at least one file system to be always mounted and accessible in the container image; and
     provide the container image to an execution platform, separate from the content platform, to instantiate one or more instances of the container image on an as needed basis, in view of the subscription to the content platform, to present the selected content via the one or more instances of the container image,
     wherein, to instantiate the one or more instances of the container image on the as needed basis, the processing device is to cause the execution platform to instantiate a required number of instances of the container image, the required number being determined according to a user requirement.

9. The system of claim 8, wherein the execution platform is a cloud computing platform.

10. The system of claim 8, wherein the selected content comprises one or more software programs included in the subscription to the content platform.

11. The system of claim 8, wherein the selection comprises a selection of a subset of available content associated with the content platform.

12. The system of claim 8, wherein to generate the container image, the processing device is to:
identify the at least one file system of the selected content associated with the content platform; and
store the at least one file system as part of the container image.

13. The system of claim 8, wherein each of the one or more instances of the container image comprises the selected content retrieved from the content platform.

14. The system of claim 8, wherein the processing device is further to:
determine that at least one of the one or more instances of the container image that is no longer in use; and
destroy the at least one of the one or more instances of the container image that is no longer in use.

15. A non-transitory computer-readable storage medium including instructions that, when executed by a processing device, cause the processing device to:
present a list of available user consumable content associated with a content platform;
receive a selection of content from a list of available content associated with a content platform, wherein the selected content comprises user consumable data accessible via a subscription to the content platform;
in response to receiving the selection, retrieve the selected content from the content platform;
containerize the selected content by generating, by the processing device, a container image comprising the selected content, wherein, to generate the container image, the processing device is to:
clone at least one file system including the selected content, and
incorporate the at least one file system within the container image, wherein the cloning causes the at least one file system to be always mounted and accessible in the container image; and
provide, by the processing device, the container image to an execution platform, separate from the content platform, to instantiate one or more instances of the container image on an as needed basis, in view of the subscription to the content platform, to present the selected content via the one or more instances of the container image,
wherein, to instantiate the one or more instances of the container image on the as needed basis, the processing device is to cause the execution platform to instantiate a required number of instances of the container image, the required number being determined according to a user requirement.

16. The non-transitory computer-readable storage medium of claim 15, wherein the execution platform is a cloud computing platform.

17. The non-transitory computer-readable storage medium of claim 15, wherein the selected content comprises one or more software programs included in the subscription to the content platform.

18. The non-transitory computer-readable storage medium of claim 15, wherein the selection comprises a selection of a subset of available content associated with the content platform.

19. The non-transitory computer-readable storage medium of claim 15, wherein to generate the container image, the processing device is to:
identify the at least one file system of the selected content associated with the content platform; and
store the at least one file system as part of the container image.

20. The non-transitory computer-readable storage medium of claim 15, wherein each of the one or more instances of the container image comprises the selected content retrieved from the content platform.

* * * * *